United States Patent [19]

Nixon et al.

[11] 4,208,759
[45] Jun. 24, 1980

[54] WINDSHIELD WIPER ATTACHMENT

[76] Inventors: Raymond F. Nixon, 760 Orion Rd., Apt. 232, Lake Orion, Mich. 48035; Chris Nixon, 5880 Sawmill Lake Rd., Ortonville, Mich. 48462

[21] Appl. No.: 925,030

[22] Filed: Jul. 17, 1978

[51] Int. Cl.² .......................... A47L 1/02; B60S 1/04; B60S 1/44
[52] U.S. Cl. .............................. 15/250.23; 15/250.32
[58] Field of Search ............ 15/250.21, 250.23, 250.32, 15/250.42

[56] References Cited

U.S. PATENT DOCUMENTS

| | | | |
|---|---|---|---|
| 1,727,456 | 9/1929 | Uddenborg | 15/250.32 |
| 2,576,809 | 11/1951 | Rappl | 15/250.32 |
| 3,660,862 | 5/1972 | Scinta | 15/250.23 |
| 3,868,743 | 3/1975 | Kakizaki | 15/250.23 |

FOREIGN PATENT DOCUMENTS 1386581   3/1975   United Kingdom .................. 15/250.23

Primary Examiner—Harvey C. Hornsby
Assistant Examiner—Timothy F. Simone
Attorney, Agent, or Firm—Reising, Ethington, Barnard, Perry & Brooks

[57] ABSTRACT

A windshield wiper attachment disclosed comprises an elongated wiper blade member and a carriage member including a pivot arm for supporting the blade member at a first end of the pivot arm. The attachment further comprises an adaptor assembly including a bracket pivotally connected to a second end of the pivot arm and an adaptor pivotally connected to the bracket, the adaptor being adapted for connection with a wiper arm member. When the adaptor is connected to an arm member, the adaptor, the arm member, the bracket, the first end of the pivot arm and the blade member are aligned.

A second windshield wiper attachment also disclosed comprises the same elongated upper blade member and adaptor of the first windshield wiper attachment. A second carriage member of the second attachment includes a disk member for supporting the blade element by flanges integrally formed therewith at a position spaced from a central pivot axis. The second attachment further comprises a circular bracket pivotally connected to the disk member at the pivot axis, the adaptor being pivotally connected to the circular bracket.

9 Claims, 8 Drawing Figures

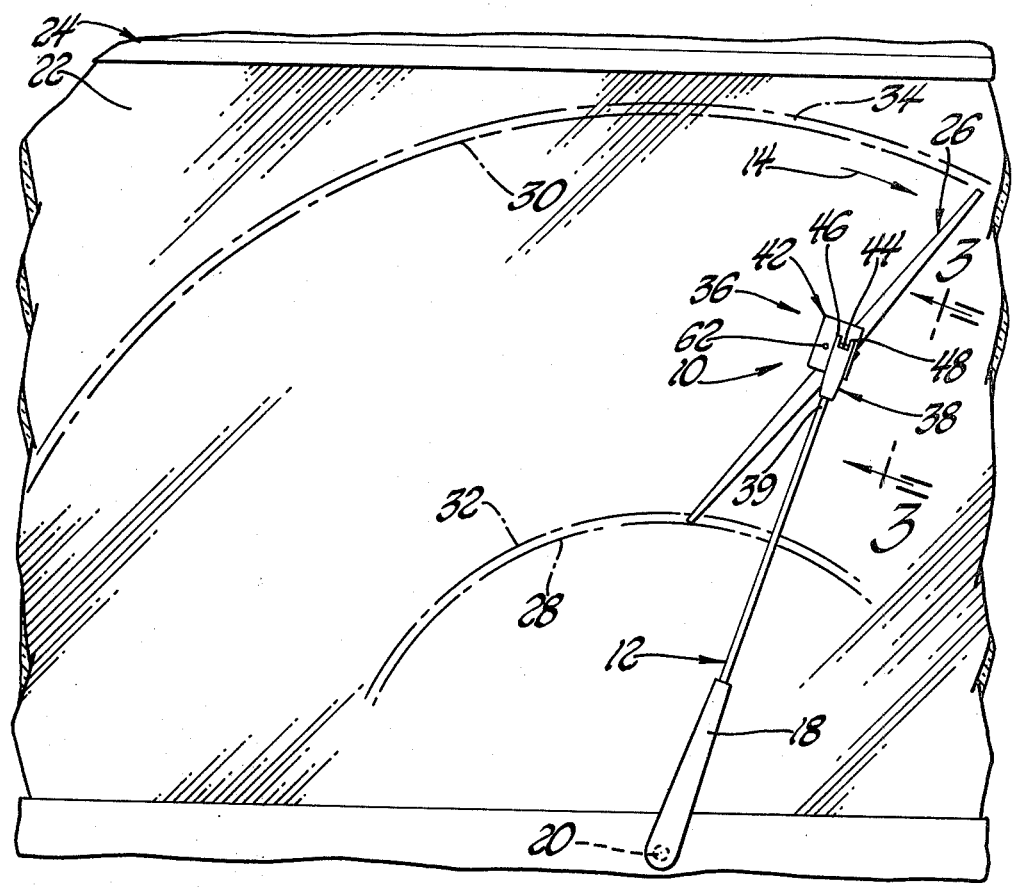

WINDSHIELD WIPER ATTACHMENT

TECHNICAL FIELD

This invention relates to windshield wiper attachments and, in particular, to windshield wiper attachments which are adapted to be vertically displaced on a windshield.

BACKGROUND ART

During the wiping operation of a windshield wiper some portions of the blade member deteriorate before other portions. As a result of these deteriorations undesirable streaks are formed on the windshield of the vehicle during subsequent operation of the windshield wiper. In order to eliminate these streaks and also to increase the effective area wiped by the blade member, prior art methods and apparatus have directed their attention to the solution of these problems. For example, U.S. Pat. No. of Perkins et al, 2,821,735 discloses a windshield wiper which is designed and constructed as to affect a relative displacement of the wiper blade to its carrier or actuating arm so that when moved in one direction the wiper blade will travel over a given area of the windshield and when moved in the opposite direction it will travel over a somewhat extended or partially overlapped area to that of the companion wiper stroke. The wiper blade is suspended from the actuating arm so as to automatically cause its end-wise displacement relative thereto. The wiper blade is automatically caused to be relatively displaced by a pair of links pivotally connecting the wiper blade member and the arm member. Stop means limit the longitudinal movement of the arm and wiper blade members longitudinally with respect to each other.

Likewise the U.S. Pat. No. to Kato 3,422,480 discloses a windshield wiper apparatus for use in a vehicle comprising a crank arm connected to a driving shaft and which is adapted to be rotated thereby. A wiper arm is pivotally connected to one end of the crank arm and has a wiper blade fixedly mounted thereon at the other end thereof. An oscillation lever is pivotally connected at one end of the wiper arm at a point between the opposite ends thereof and is also pivotally connected at a point near the other end whereby the blade upon rotation of the crank arm is driven to move in such manner that the ends of the blade describe loops on the surface of the windshield.

Other windshield wiper attachments generally of the type to which this invention relates are disclosed in the U.S. Pat. Nos. of Carey 2,412,319, Lacey, 2,644,187 and Wise 2,809,388.

DISCLOSURE OF THE INVENTION

An object of the present invention is to provide a windshield wiper attachment adapted to be connected to an elongated wiper arm member which in turn is adapted to oscillate in a first direction and in a second direction wherein the attachment eliminates formation of undesirable streaks by producing an orbital motion to wipe larger areas of the windshield and wherein the attachment contains only one moving part.

Another object of this invention is to provide a windshield wiper attachment adapted to be connected to an elongated wiper arm member at an adaptor means adapted for connection with the wiper arm member, the adaptor means being adaptable to standard windshield systems through a simple installation procedure.

A further object of this invention is to provide a windshield wiper attachment adapted to be connected to an elongated wiper arm member which in turn is adapted to oscillate, the arm member urging the attachment toward a window when connected thereto and wherein the attachment includes an elongated wiper blade member, a carriage means including a pivot arm for supporting the blade member at a first end of the pivot arm and an adaptor means pivotally connected to the second end of the pivot arm and adapted for connection with the arm member; the adaptor means, the first end of the pivot arm and the blade member being aligned throughout the oscillatory movement to maintain the strength and rigidity between the arm member and the blade member, the pressure and directional forces between the blade member and the windshield being substantially unchanged throughout the oscillatory movement.

The alignment of the adaptor means, the first end of the pivot arm and the blade member further allowing the passengers of the vehicle to which the windshield wiper attachment is attached to see through a greater area of the windshield throughout the oscillatory movement, whereby the vision of the passengers is minimally obstructed.

Yet another object of this invention is to provide a windshield wiper attachment wherein the attachment contains only one moving part and wherein the moving part is shielded from foreign matter, thereby allowing the movement to proceed unimpeded.

In carrying out the above objects and other objects of this invention a preferred embodiment of the invention includes an operating arm attachment member detachably connectable with a wiper operating arm; a wiper blade carrying member having a wiper blade attachment portion; means pivotally securing said member together at a location spaced from said upper blade attachment portion so that pivotal movement of said members with respect to each other causes pivotal movement of said wiper blade with respect to said wiper operating arm; and stop means for limiting the pivotal movement of said wiper blade carrying member between first and second angularly spaced positions with respect to the pivotal axis between the members; the attachment member, the connected operating arm, the attachment portion and the carried wiper blade are aligned, throughout the pivotal movement.

The objects, features and advantages of the present invention are readily apparent from the following detailed description of the best mode taken in connection with the accompanying drawings.

BEST DESCRIPTION OF DRAWINGS

FIG. 1 shows a windshield wiper attachment or mechanism constructed according to this invention in its operating environment;

FIG. 2 is an enlarged, partially broken away view of the attachment of FIG. 1;

BEST MODE FOR CARRYING OUT THE INVENTION

Figure 3:
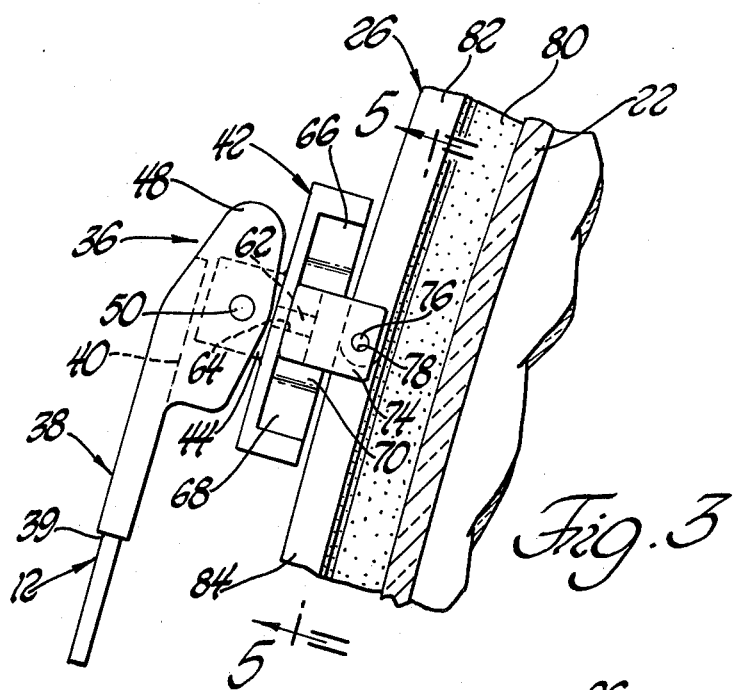
FIG. 3 is a cross-sectional view, partially broken away, of the attachment taken along the line 3—3 of FIG. 1.

Referring to FIG. 1, a window or windshield wiper attachment or mechanism constructed according to the present invention is indicated generally by reference numeral 10. As shown in FIGS. 1 through 5, excepting FIG. 4, the attachment 10 is removably connected to a windshield wiper operating arm or wiper arm member generally indicated at 12. In turn the arm member 12 is adapted to oscillate in a first direction shown in FIG. 1 by an arrow 14 and then in the second direction as shown in phantom in FIGS. 2 and 5 by an arrow 16.

The arm member 12 includes a base element 18 which is secured in a conventional fashion to a drum head 20 of a pivot shaft (not shown) whereby the arm member 12 pivots about the pivot shaft to oscillate over a windshield 22 of a vehicle 24. The arm member 12 urges the attachment 10 toward the windshield 22 when the attachment 10 is connected thereto.

During the oscillatory movement of the arm member 12 and the connected attachment 10 in the first direction 14, a wiper blade member 26 wipes an area of the windshield 22 defined by phantom lines, 28 and 30, as shown in FIG. 1. The blade member 26 wipes an area of the windshield 22 defined by phantom lines 32 and 34 of FIG. 1 when the arm member 12 and the attachment 10 move in the second direction 16.

The attachment 10 includes an operating arm attachment member or an adaptor assembly generally indicated at 36. The adaptor assembly 36 includes an integrally formed plastic adaptor generally indicated at 38 which is adapted for slidably receiving the end 39 of the arm member 12 opposite the base 18 in a cavity 40 as shown in FIG. 3. The adaptor 38 provides a snug female connection for the end 39 of the arm member 12 within the cavity 40.

The adaptor assembly 36 also includes an integrally formed plastic bracket, generally indicated at 42, having a block portion 44 formed therewith at the top surface thereof. A pair of mounting flanges 46 and 48 of the adaptor 38 are disposed on opposite sides of the block 44, a pin 50 being disposed in an aperture 52 extending through the flanges 46 and 48 and the block 44 to thereby pivotally connect the adaptor to the bracket 42 perpendicular to an axis extending along the length of the arm member 12.

Figure 4:
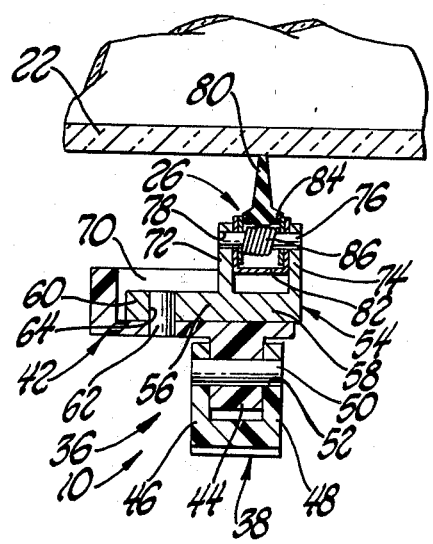
FIG. 4 is a cross-sectional view, partially broken away, of the attachment taken along the line 4—4 of FIG. 2.

As shown in FIG. 4, the attachment 10 also includes a wiper blade carrying member or an integrally formed metal carriage member generally indicated at 54 which in turn includes a pivot arm 56 for supporting the blade member 26 at a first end 58 of the pivot arm 56. The carriage member 54 may be formed from any light, wear-resistant metal such as aluminum.

The bracket 42 is pivotally connected to a second end 60 of the pivot arm 56 at a position spaced from the block 44 by a pivot pin 62. The pivot pin 62 is disposed in an aperture 64 which extends through the bracket 42 and the pivot arm 56 at the second end 60. p A pair of sloping surfaces 66 and 68 help to define a dished-out cavity 70 in the bracket 42 in which the pivot arm 56 is allowed to pivot. The sloping surfaces 66 and 68 define a stop means or pair of stops for limiting the pivotal movement of the pivot arm 56 between a second angularly spaced position and a first angularly spaced position, respectively. The connected arm member 12 moves in the first direction 14 with the pivot arm 56 at a second position. The connected arm member 12 moves in the second direction 16 with the pivot arm 56 at the first position.

During the oscillatory movement, the adaptor 38, the bracket 42, the first end 58 of the pivot arm 56 and the blade member 26 are in alignment. In other words, at any one time during the oscillatory movement a single straight line axis intersects all of the above-noted elements of the attachment 10. Furthermore, the portion of the bracket 42 in alignment with the first end 58 of the pivot arm 56 slidably engages the first end 58 throughout the oscillatory movement, thereby urging the blade member 26 toward or against the windshield 22, in response to the urging force exerted by the arm member 12 on the attachment of the adaptor 38.

The carriage member 54 further includes a pair of integrally formed flanges 72 and 74 spaced along the pivot arm 56 of the first end 58. The blade member 26 is disposed between the flanges 72 and 74 and is pivotally connected thereto by a pivot pin 76 which is disposed in an opening 78 extending through the blade member 26 and the flanges 72 and 74.

The blade member 26 includes a wiper blade 80 comprising a rubber or rubber-like material for slidably engaging the windshield 22. The wiper blade 80 is disposed in an upper blade fitting 82 and a lower blade fitting 84. A spring is disposed about the pivot pin 76 and biases the upper blade fitting 82 with respect to the lower blade fitting 84 in a conventional fashion thereby urging the upper blade fitting 82 and the lower blade fitting 84 against the windshield 22. The upper blade fitting 82 and the lower blade fitting 84 are pivotally connected to each other and to the flanges 72 and 74 about the pivot pin 76.

OPERATION

Figure 5:
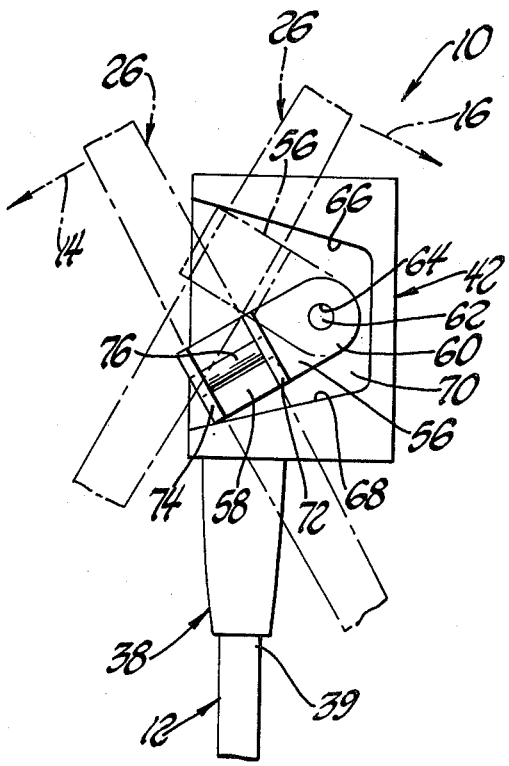
FIG. 5 is a back elevational view, partially broken away, of the attachment taken along the line 5—5 of FIG. 3.
Figure 6:
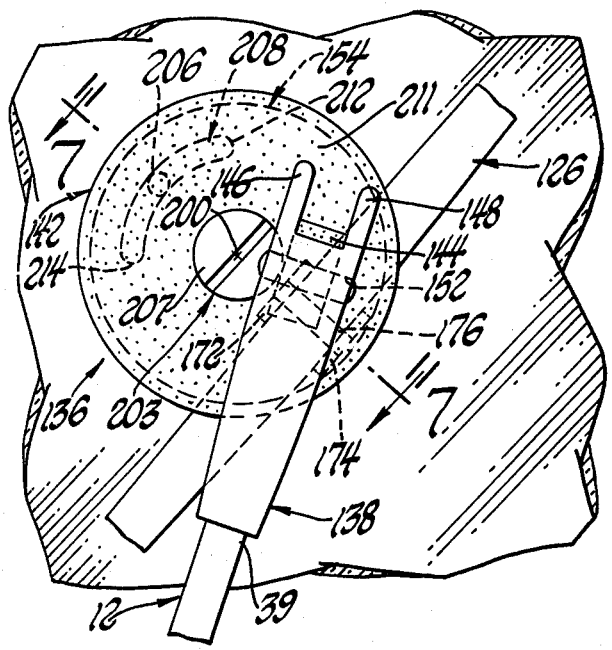
FIG. 6 is a top view, partially broken away, of a second and preferred embodiment of a windshield wiper attachment constructed according to this invention.

After the attachment 10 is connected to the arm member 12 via the adaptor 38, movement of the arm member 12 in a clockwise or first direction 14 as shown in FIG. 1 causes the pivot arm to rotate until the first end of the pivot arm 56 engages the second sloping surface 68 of the bracket 42. Upon reversing direction of the arm member 12 to move in a counter-clockwise or the second direction 16 as shown in FIG. 1, the pivot arm 56 rotates upwardly as shown in FIG. 5 until the first end 58 of the pivot arm 56 engages the first sloping surface 66. Such reversal causes the blade member 26 to sweep out an area on the windshield 22 defined by phantom lines 32 and 34 as shown in FIG. 1. This area is disposed slightly above the area defined by the phantom lines 28 and 30 which are swept out by the blade member 26 while traveling in the first direction. Throughout this oscillatory movement, the adaptor 38, the bracket 42, the first end 58 of the pivot arm 56 and the blade member 26 are aligned, the portion of the bracket 42 in alignment with the first end 58 engaging the first end 58 throughout the oscillatory movement due to the urging force of the arm member 12 on the adaptor 38. In this way, the strength and rigidity between the arm member 12 and the blade member 26 are maintained to allow the pressure and directional forces between the blade member 26 and the windshield 22 to stay substantially constant.

Figure 7:
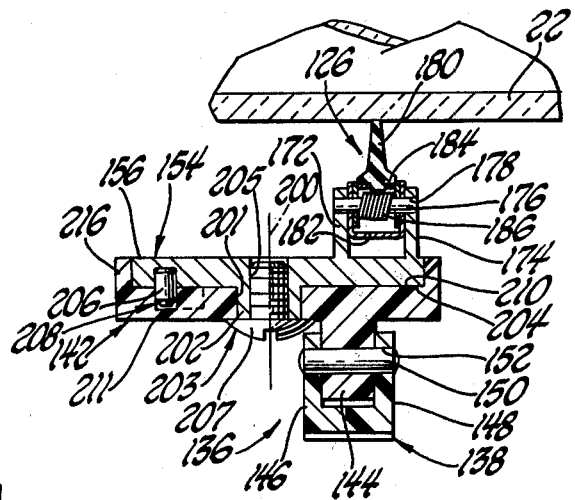
FIG. 7 is a cross-sectional view, partially broken away, of the attachment taken along the line 7—7 of FIG. 6.
Figure 8:
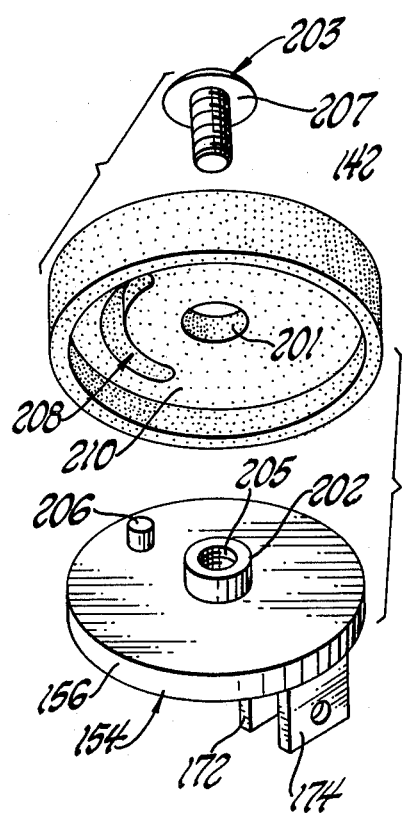
FIG. 8 is a perspective view of the attachment of FIG. 7 disassembled.

FIGS. 7 and 8 show a preferred construction of an adaptor means including an integrally formed plastic circular bracket generally indicated at 142 and a preferred construction of a carriage means in the form of an integrally formed metal second carriage member generally indicated at 154. An adaptor 138, as shown in FIG. 7, is the same as the adaptor 38 and includes flanges 146 and 148. A pivot pin 150 is disposed in an aperture 152 extending through the flanges 146 and 148 and a block portion 144. A blade member 126 is the same as the blade member 26 and includes a wiper blade 180 and fittings 182 and 184 in which the blade 180 is disposed. A pivot pin 176 is disposed in an opening 178 extending through the blade member 126 and the flanges 172 and 174. A spring 186 is disposed about the pivot pin 176 and biases the upper blade fitting 182 with respect to the lower blade fitting 184 as in the first embodiment.

The second carriage member 154 includes a circular disk member 156 for supporting the blade member 126 by the flanges 172 and 174 integrally formed therewith at a position spaced from a central pivot axis 200 of the disk member 156. The blade member is pivotally connected to the flanges 172 and 174 in the same fashion, as in the first embodiment.

The second carriage member further includes a cylindrical portion 202 concentrically and integrally formed at the top surface 204 of the disk member 156 about the pivot axis 200. A nib 206 is also integrally formed at the top surface 204 of the disk member 156 and is spaced from the pivot axis 200 opposite the flanges 172 and 174.

As in the first embodiment, the circular bracket 142 includes the integrally formed block portion 144 with the aperture 152 extending therethrough and through the adaptor 138 for pivotally connecting the adaptor 128 by the pin 150 disposed within the aperture 152.

The circular bracket 142 has an aperture 201 centrally formed therethrough in which the cylindrical portion 202 is secured by a screw, generally indicated at 203, which is threadedly secured within a threaded aperture 205 extending through the portion 202 and into the disk member 156. The diameter of the circular head 207 of the screw 203 is larger than the diameter of the aperture 201 to thereby pivotally secure the circular bracket 142 to the second carriage member 154 about the pivot axis 200. The undersurface of the head 207 slidably engages the top surface 211 of the bracket 142 about the aperture 201.

The circular bracket 142 also includes an arcuate slot generally indicated at 208 formed in the lower surface 210 of the circular bracket 142. Those portions of the circular bracket 142 defining the ends 212 and 214 of the arcuate slot 208 also define first and second positions or stops between which the nib 206 is constrained to privotally move about the pivot axis 200.

The circular bracket 142 also includes a circular lip portion 216 which circumferentially encloses the connected second carriage member 154 to shield or protect the pivot movement from foreign matter such as ice or snow.

OPERATION

As in the operation of the first embodiment a single moving part, the second carriage member 154, pivots or rotates about a pivot axis 200. The second carriage member 154 rotates until the nib 206 encounters those portions of the circular bracket 142 which define the ends 212 and 214 of the arcuate slot 208 in which the nib 206 is constrained to move. The second and preferred embodiment provides all the advantages of the first embodiment while also protecting or shielding the necessary pivotal movement of the second carriage member 154 with respect to the circular bracket 142 from foreign material.

The invention has been described in an illustrative manner, and it is to be understood that the terminology which has been used is intended to be in the nature of words of description, rather than of limitation.

Many modifications and variations of the present invention are possible in light of the above teachings. It is, therefore, to be understood that the invention may be practiced otherwise than as specifically described.

What is claimed is:

1. A windshield wiper mechanism adapted to be connected to a windshield wiper operating arm and carry a windshield wiper blade, said mechanism comprising: an operating arm attachment member detachably connectable with the wiper operating arm; a wiper blade carrying member having a wiper blade attachment portion; means pivotally securing said members together at a location laterally spaced from both said wiper blade attachment portion and the upper operating arm so that pivotal movement of said members with respect to each other causes pivotal movement of said wiper blade with respect to said wiper operating arm whereby two different wiping paths are traversed when the wiper operating arm is moved in opposite directions; and stop means for limiting the pivotal movement of said wiper blade carrying member between first and second angularly spaced positions with respect to the pivotal axis between said members; said attachment member, the connected operating arm, the attachment portion and the carried blade being aligned in a direction normal to a windshield throughout the pivotal movement.

2. The mechanism as claimed in claim 1 wherein the portion of said attachment member in alignment with said carrying member engages said carrying member throughout the pivotal movement.

3. The mechanism as claimed in claim 1 or claim 2 wherein said carrying member includes a disc member; and said attachment portion being spaced a predetermined distance from the center of said disc member.

4. The mechanism as claimed in claim 2 wherein said attachment member further includes an adaptor pivotally attached to said attachment member and adapted for the detachable connection of the operating arm.

5. The mechanism as claimed in claim 3 wherein said carrying member includes a nib fixedly secured to said disk member at a location spaced from the center of said disc member and wherein said attachment member includes an arcuate slot, said nib being disposed within said slot, the ends of said slot defined by said stop means which, in turn, define said first and second positions for limiting said pivotal movement, said nib moving within said slot and engaging said stop means in said first and second positions.

6. The mechanism as defined in claim 1 wherein said mechanism further comprises a wiper blade carried by said carrying member.

7. The mechanism as claimed in claim 1 wherein said carrying member includes a pivot arm adapted for supporting the wiper blade at a first end of the pivot arm laterally spaced from the pivot means.

8. The mechanism as claimed in claim 7 wherein the carrying member includes a pair of flanges spaced along said pivot arm at said first end and adapted to receive the windshield wiper blade therebetween.

9. The mechanism as claimed in claim 8 including a windshield wiper blade, said wiper blade including an upper blade fitting and a lower blade fitting, the upper and lower blade fittings being pivotally connected together between said flanges.

* * * * *